(No Model.)
F. RHIND.
ACETYLENE GAS GENERATING LAMP.
No. 589,099. Patented Aug. 31, 1897.
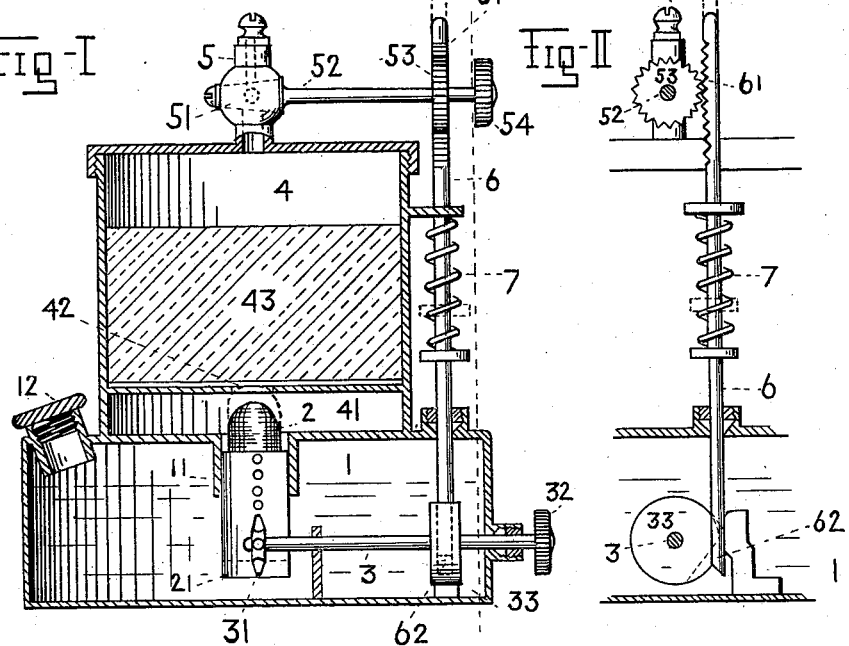
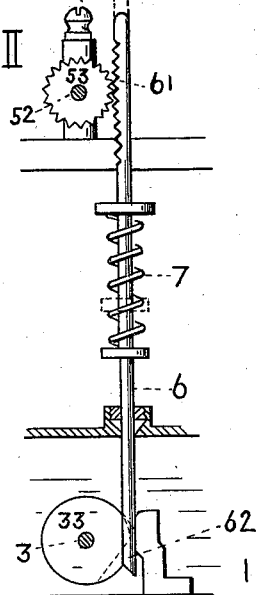
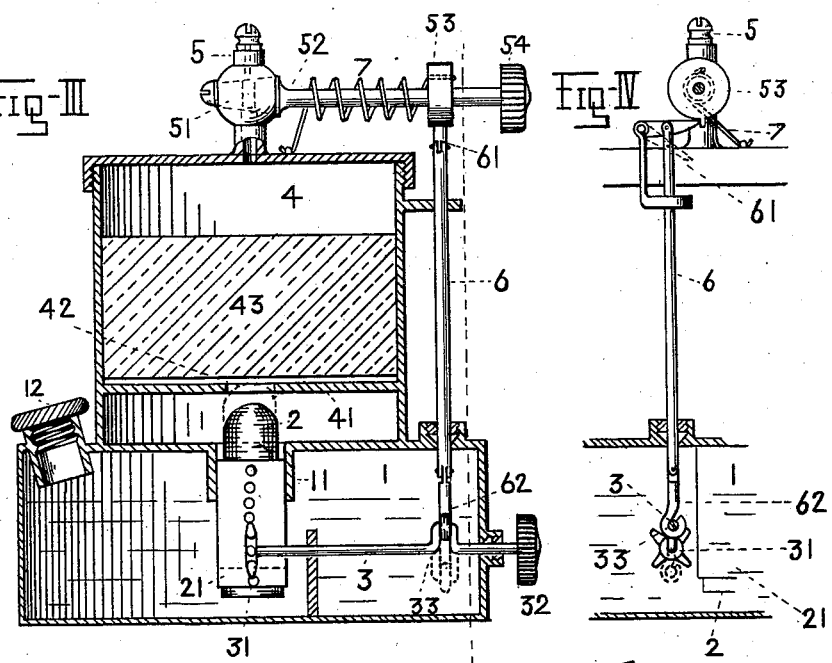
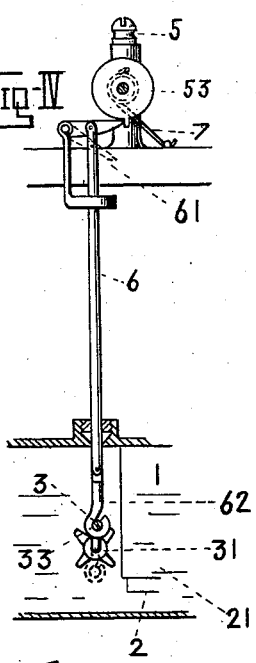
WITNESSES:
Jas. R. Cox
J. G. Stoddard Pen'
Frank Rhind  INVENTOR
BY Geo. L. Cooper
ATTORNEY

UNITED STATES PATENT OFFICE.

FRANK RHIND, OF BRIDGEPORT, CONNECTICUT, ASSIGNOR OF ONE-HALF TO THE BRIDGEPORT BRASS COMPANY, OF SAME PLACE.

ACETYLENE-GAS-GENERATING LAMP.

SPECIFICATION forming part of Letters Patent No. 589,099, dated August 31, 1897.

Application filed May 7, 1897. Serial No. 635,537. (No model.)

*To all whom it may concern:*

Be it known that I, FRANK RHIND, a citizen of the United States, residing at Bridgeport, Connecticut, have invented a new and useful Improvement in Gas-Generating Lamps, of which the following is a specification.

My invention relates to that class of lamps which are provided with generators adapted to the production of a gas from the reaction between a solid, as calcium carbid, and a liquid, as water. It is especially adapted to portable lamps in which the gas-chambers are necessarily small and of limited strength. It is intended to provide against an undue accumulation of gas in the reservoir.

In the accompanying drawings, Figures I and III represent, partly in elevation and partly in vertical section, varying forms of my device. Figs. II and IV are vertical sections through the dotted lines in Figs. I and III, respectively.

1 designates a liquid-containing chamber or fount provided with wick-tube 11 and filler-opening 12; 2, a wick; 21, a wick-sleeve; 3, a wick-shaft provided with pinion 31, button 32, and locking device 33; 4, a solid-containing chamber provided with diaphragm 41, having an aperture 42 and containing a consumable mass 43; 5, a gas valve or cock having a plug 51, stem 52, pinion 53, and button 54; 6, a connecting-rod formed with engaging device 61 and foot 62; 7, a spring.

In the example of my invention shown in Figs. I and II of the drawings the liquid chamber or fount 1, which may be of any desired form, is shown as a low cylinder having a central wick-tube 11 and a filler-opening 12. The wick 2 is shown as cylindric and pointed at its upper end. It is inclosed in a sleeve 21, having a rack with which the pinion 31 of the wick-shaft 3 engages. At the free end of the shaft 3 and without the fount 1 is a thumb wheel or button 32. The locking device 33 is here shown as a segmental cam, the function of which will hereinafter appear. Upon the fount 1 is mounted the solid-containing chamber 4, the bottom of which is a diaphragm 41, having a central aperture 42. The chamber 4 is adapted to contain a consumable mass 43, as of calcium carbid. To the chamber 4 is attached a gas valve or cock 5, which, as shown, has a plug 51. The free end of the plug-stem 52 carries a thumb-button 54. On the stem 52 is also mounted a pinion 53, the teeth of which mesh with a rack 61 on a connecting-rod 6. The foot 62 of the rod 6 is preferably beveled to ride on the periphery of the cam 33. On the rod 6 is a coiled spring 7, which tends to force the rod 6 downward.

The operation of my device will be readily understood from an examination of the drawings. These show the parts in their non-operative position, the cock 5 being closed and the wick 2 out of contact with the carbid or other mass 43 in the chamber 4. To cause the generation of gas, it is necessary to raise the wick 2, but this cannot be done because of the locking of the flat side of the segmental cam 33 against the foot 62 of the rod 6. I have shown in Fig. II a brace which serves to prevent the rod 6 being sprung or bent by the cam 33. It is therefore necessary to first raise the rod 6, which is done by means of the button 54, the pinion 53 engaging with the rack 61 at the top of the rod 6. This operation through the stem 52 turns the plug 51 and opens the valve 5 or gas-emission orifice. The wick may then be raised to its operative position, as shown in dotted lines. The generation of gas begins at once and it may be lighted at the burner-tip. (Shown.) As the cock 5 is engaged, through the pinion 53 and rack 61, with the rod 6 it can only be closed by turning the cam 33, with which the foot 62 of the rod 6 engages, back to the position in which the wick 2 is lowered out of contact with the mass 43. As the spring 7 acts strongly to lower the rod 6 it is in practice only necessary to turn the button 32, so as to lower the wick, when the cock 5 closes automatically.

It will be noted that the necessary regulation of the flame is readily secured by increasing or diminishing the flow of liquid to the mass 43. As here shown, this is done by forcing the pointed end of the wick 2 with greater or less force against the mass. This of course can be done without altering the position of the cock-plug 51, the foot 62 of the rod riding on the arc of the cam 33.

In Figs. III and IV of the drawings the construction and arrangement of parts is as above described except as noted. The locking device 33 on the wick-shaft 3 is here shown as an ordinary double crank engaging with a pitman 62, which forms the foot of the connecting-rod 6. At the upper end of the rod 6 is an engaging device 61 in the form of a pawl which engages with a one-tooth pinion 53 on the cock-stem 52. The operating-spring 7 is in this construction mounted on the stem 52 and tends to hold the plug 51 in its open position.

As shown, the cock 5 is closed and the wick 2 out of contact with the mass 43. To raise the wick so as to convey the liquid in the fount 1 to the mass 43, it is necessary to turn the button 32, which, through the rod 6, trips the pawl 61 and releases the pinion 53. The spring 7 then acts to open the cock 5, so that the gas as fast as formed may escape through the emission-orifice of the cock. By reason of the action of the spring 7 the cock 5 will not remain in its closed position unless the wick is first lowered, thereby raising the pawl 61 to its operative position, where it may engage with the tooth on the pinion 53.

It will be seen that in both forms of my device the gas-orifice must be open when liquid is being conveyed to the consumable solid, so that no pressure can be produced in the chambers except by the gas generated by the residual liquid in the waste product of the solid, as the hydrated lime from the carbid. This is found in practice to be inconsiderable, or, at most, easily controlled.

I am aware that many alterations may be made not only in the design and appearance of my device and in the form and arrangement of parts, but also in the means employed to interlock the generating and emitting portions.

What I claim as my invention, and desire to secure by Letters Patent of the United States, is as follows:

1. In a lamp or other gas-generating apparatus in combination, a liquid-chamber, means for retaining in position a consumable mass, a gas-emission valve, manually-operated means for causing and discontinuing the flow of liquid to said mass and means for automatically retaining said valve in its open position during the flow of said liquid, substantially as described.

2. In a lamp or other gas-generating apparatus in combination, a liquid-chamber, means for retaining in position a consumable mass, a gas-emission valve, manually-operated means for causing and discontinuing the flow of liquid to said mass and means for automatically preventing the causing of such flow of liquid except when said valve is in its open position, substantially as described.

3. In a lamp or other gas-generating apparatus in combination, a liquid-chamber, means for retaining in position a consumable mass, a gas-emission valve, a wick adapted to convey liquid to said mass, manually-operated means for causing and discontinuing the flow of liquid through said wick and means for automatically retaining said valve in its open position during the flow of said liquid, substantially as described.

4. In a lamp or other gas-generating apparatus in combination, a liquid-chamber, means for retaining in position a consumable mass, a gas-emission valve, a wick adapted to convey liquid to said mass, manually-operated means for causing and discontinuing the flow of liquid through said wick and means for automatically preventing the causing of such flow of liquid except when said valve is in its open position, substantially as described.

5. In a lamp or other gas-generating apparatus in combination, a liquid-chamber, means for retaining in position a consumable mass, a gas-emission valve, a wick adapted to convey liquid to said mass, manually-operated means for bringing said wick and said mass into and out of contact and means for automatically retaining said valve in its open position during such contact, substantially as described.

6. In a lamp or other gas-generating apparatus in combination, a liquid-chamber, means for retaining in position a consumable mass, a gas-emission valve, a wick adapted to convey liquid to said mass, manually-operated means for bringing said wick and said mass into and out of contact and means for automatically preventing the causing of such contact except when said valve is in its open position, substantially as described.

7. In a lamp in combination, a liquid-chamber, a second chamber adapted to contain a consumable mass, a wick adapted to convey liquid to said mass, a shaft by which said wick is manually adjustable, a manually-adjustable gas-valve, and means for automatically retaining said valve in its open position when said wick is in contact with said mass, substantially as described.

8. In a lamp in combination, a liquid-chamber, a second chamber adapted to contain a consumable mass, a wick adapted to convey liquid to said mass, a shaft by which said wick is manually adjustable, a gas-valve and means for automatically preventing the bringing of said wick and said mass into contact except when said valve is in its open position, substantially as described.

FRANK RHIND.

Witnesses:
GEO. L. COOPER,
JAS. R. COE.